INVENTOR.
RICHARD K. NAKATANI
BY
Christie, Parker & Hale
ATTORNEYS.

June 11, 1963  R. K. NAKATANI  3,093,196
EARTH OPENING DEVICE
Filed May 2, 1960  3 Sheets-Sheet 3
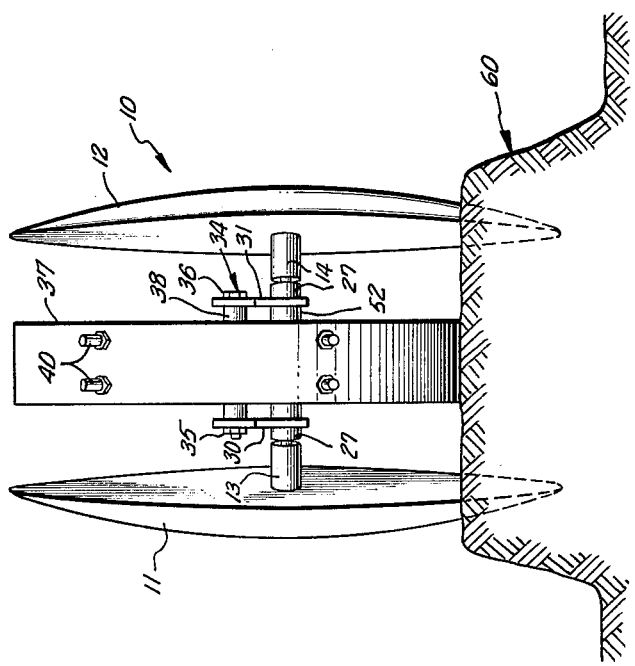
FIG. 3.
FIG. 4.
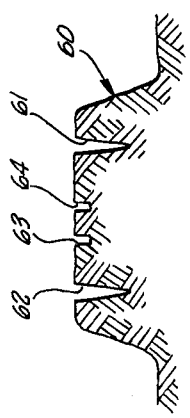
INVENTOR.
RICHARD K. NAKATANI
BY
Christie, Parker & Hale
ATTORNEYS.

United States Patent Office 3,093,196
Patented June 11, 1963

3,093,196
EARTH OPENING DEVICE
Richard K. Nakatani, 14601 Bushard, Santa Ana, Calif.
Filed May 2, 1960, Ser. No. 26,037
4 Claims. (Cl. 172—158)

This invention relates to a device for opening earth and more particularly to opening a bed of earth to facilitate the planting of small agricultural plants therein.

Normally, small agricultural plants are planted in a bed which consists of a raised earth portion of finely divided dirt separated from an adjacent raised dirt portion by a trench. In the process of planting the plants by conventional practice, it is necessary to dig an individual hole in the earth in order to provide a place for each plant to be inserted. The plant is placed in this hole. The hole is then filled with dirt to hold the plant in place.

It is extremely time consuming and laborious to dig individual holes for each of the plants to be planted. Furthermore, the necessity for filling the hole with dirt is also tedious and time consuming. In the process of digging the required holes, the configuration of the raised earth portion is often distorted, so that future cultivation of the plants is impeded when the conventional practice described is followed.

According to the present invention, an earth opening device consisting of an axle on which are rotatably mounted a pair of disks is utilized to open the bed in two parallel openings. Each of the disks has a curved face and a flat face and the disks are mounted on the axle. In its preferred embodiment, the flat faces open onto each other. Means are provided to bow the axle so as to toe-in the two disks.

By toeing-in the disks, it has been found that dirt does not cling to the disks as the disks leave the earth, and, therefore, the configuration of the bed remains undisturbed except for the parallel openings made therein. These parallel openings have the additional advantage in a raised bed of enabling dirt to be placed around the plant very simply. When utilizing the device according to the present invention, after the plant is inserted in the opening, the side of the bed is merely pushed against the center of the bed so as to force the dirt around the plant to hold the plant in position. No filling operation other than this is necessary or desirable.

In a further refinement of earth opening devices according to the invention, a rotatable earth marking wheel is utilized to mark the points along the bed where plants are to be inserted. The use of such a wheel insures that an even spacing of plants is achieved.

In the apparatus of the invention, the earth marking wheel and the axle are attached to a frame, which is utilized, in conjunction with a source of locomotion, to move the disks and the marking wheel along the bed so as to provide the required openings and marks in the earth.

The invention may be more readily understood by referring to the accompanying drawings in which:

FIGURE 3 is a rear view of an earth opening device disposed on a bed being opened; and FIGURE 4 is a sectional view of a bed after opening.

Figure 1:
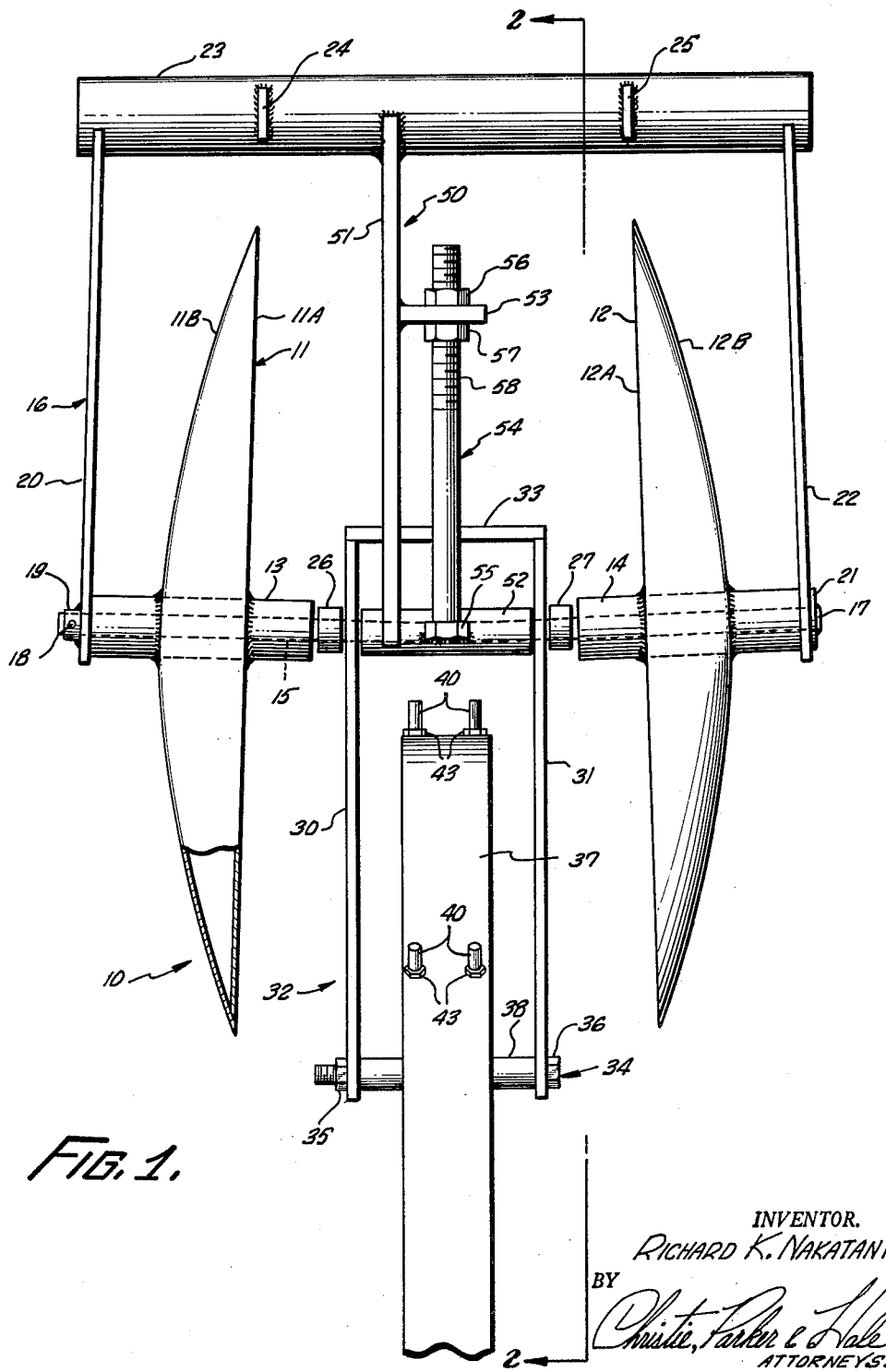
FIGURE 1 is a plan view of an earth opening device according to the invention, showing one of the disks partially in section.

Referring now to FIG. 1, an earth opening device 10 includes a first disk 11 and a second disk 12. The trailing portion of the first disk 11 is indicated in section to illustrate the fact that the disk may be of hollow construction. The disks 11 and 12 have flat faces 11A and 12A and curved faces 11B and 12B, respectively. The disks are mounted on hubs 13 and 14, respectively, which in turn are mounted on an axle indicated by the dotted line 15. The hubs 13 and 14 are free to rotate about the axle 15.

The axle 15 is connected to a frame 16 by an axle head 17 on one end of the axle and a cotter pin 18, which extends through an aperture (not shown) in the opposite end of the axle and through a pair of lugs 19 (only one of which is shown in FIG. 1) on an arm 20 of the frame 16. A washer 21 separates the head 17 from a second arm 22 of the frame while closing the aperture through the arm 22 through which the axle 15 extends. A cross member 23 connects the two arms 20 and 22 of the frame 16 and has a pair of attaching arms 24 and 25 welded thereto. The attaching arms 24 and 25 are utilized to attach the frame to a source of locomotion, for example, a tractor, by means of clamps on the tractor.

A pair of spacer washers 26 and 27 holds the disks 11 and 12 from two arms 30 and 31 of a marking wheel assembly 32. The two arms 30 and 31 are mounted on the axle 15 so as to be pivotal thereabout and are held in spaced relationship by a cross bar 33 at the end nearest the frame cross bar 23 and by an axle 34 at their opposite end. Alternatively, the arms 30 and 31 can be pivotally attached to the frame 16.

The axle 34 consists of a nut 35 threaded on a bolt 36 which extends through a pair of apertures (not shown) in the arms 30 and 31. A marking wheel 37 is mounted on the axle 34 by means of a hub 38 and spokes (see FIG. 2). The marking wheel 37 has pairs of marking studs 40 extending radially therefrom. The marking studs 40 form indentations in the earth as the marking wheel 37 rotates so as to mark the points for insertion of plants into the earth.

An axle bowing assembly 50 includes a mounting arm 51 extending from the cross member 23 to a hub 52 mounted about the axle 15 between the arms 30 and 31 of the marking wheel assembly. The mounting arm 51 is not attached to the hub 52 directly, however. Intermediate along the length of the mounting arm 51 there is positioned a mounting lug 53 having an aperture extending therethrough. A bowing bolt 54 whose head 55 is welded to the hub 52 extends through the aperture of the mounting lug 53. A tensioning nut 56 and a locking nut 57 are mounted on the bowing bolt 54 on opposite sides of the mounting lug 53. By moving the tensioning nut 56 along a threaded portion 58 of the bolt 54 a bowing force is exerted on the axle 15. The amount of bowing force is controlled by the position of the tensioning nut 56. This bowing of the axle 15 toes-in the disks 11 and 12. The mounting arm 51 extends rearwardly of the mounting lug 53 to engage the marker wheel cross bar 33 to prevent the marker wheel 37 from swinging downwardly when the earth opener 10 is lifted from the ground.

Figure 2:
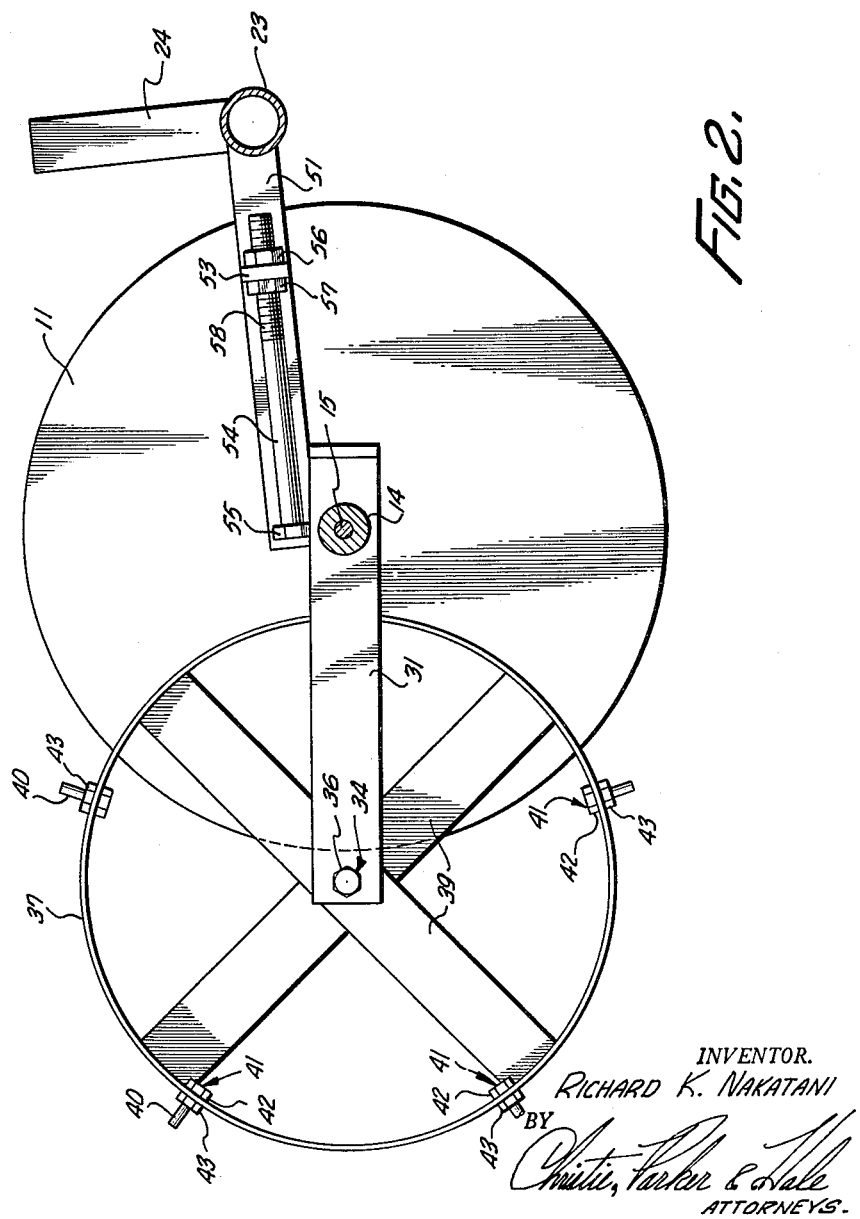
FIGURE 2 is a side elevation taken along line 2—2 of FIG. 1.

FIGURE 2 is a side elevation of the earth opening device of FIG. 1 taken along lines 2—2 thereof. As shown in FIG. 2, the cross member 23 is a hollow tube. By the parallel positioning of a number of earth opening devices 10 and the insertion of a common rod through the members 23 thereof, many earth opening devices 10 can be moved along in spaced relationship so as to open a great number of beds simultaneously while utilizing only a single source of locomotion. This greatly increases the speed of the earth opening operation and reduces overall time required for the planting of the plants.

As shown in FIG. 2, the marking wheel 37 is connected to the hub 38 (not shown in FIG. 2) by spokes 39. The spokes 39, as shown in FIG. 2, consist of two flat metallic support bars extending diametrically across the wheel 37 at right angles to each other. The marking studs 40 consist of a bolt 41 having a head 42 positioned on the inner periphery of the wheel 37 and a nut 43 threaded on the bolt 41 adjacent the outer periphery of the wheel 37.

FIGURE 3 illustrates the positioning of an earth opening device 10 on a raised bed 60 of earth. The disks 11 and 12 sink into the bed 60 due to their weight. The marking wheel 37, being comparatively light, rides on top of the bed 60. The marking studs 40 make the appropriate marking indentations into the bed 60.

FIGURE 4 is a sectional view of a bed of earth after having been processed by an earth opening device constructed according to the invention. The raised bed of earth 60 has two longitudinal openings 61 and 62 made therein by the passage of the disks 11 and 12. A pair of marking indentations 63 and 64 are made in the bed 60 by the marking studs 40. The bed 60 is left with an undisturbed top, except for the openings 61 and 62 made therein by the disks 11 and 12.

It has been found that if the disks 11 and 12 are moved through the bed 60 in a parallel relationship, even though the dirt which comprises the bed 60 is of a very granular consistency, the dirt tends to stick to the disks 11 and 12 as they leave the bed, thus disturbing the configuration of the bed. In extreme cases the sides of the bed cave in, so as to destroy the usefulness of the bed in large measure. By toeing-in the disks 11 and 12, it has been found that the disks leave the bed after making the longitudinal openings without tending to carry with them any of the dirt which comprises the bed.

This toeing of the disks 11 and 12 is an essential element of the earth opening device according to the present invention. In the embodiment shown, which is a preferred embodiment, the flat faces of the disks open onto each other. However, a device according to the invention can be constructed having the curved faces opening onto each other. In this embodiment the axle is bowed so as to toe-out rather than toe-in the disks. In this second embodiment it has been found that, in opening the bed, the earth is compacted toward the center of the bed. Such compaction causes some distortion in the bed configuration. Therefore, while this second embodiment may be utilized in the practice of the invention, the embodiment shown in the drawings is the preferred embodiment, since it does not result in compaction toward the center of the bed in opening the earth.

The invention claimed is:

1. A furrowing and earth marking apparatus for forming furrows in the top of an earth ridge to prepare a bed for plants comprising a horizontal axle extending transversely of the apparatus, a first and a second disk each having a curved face and a substantially flat face, said disks being rotatably mounted on the axle so as to be locally perpendicular thereto and so that the flat faces of the disks open onto each other, a draw bar spaced from and substantially parallel to the axle, a pair of parallel members each affixed to the draw bar at one of their ends and mounting the axle ends at their other ends, axle bowing means connected between the draw bar and the central portion of the axle and selectively operable to bow the axle rearwardly of the ends of the axle to toe-in the disks, and an earth marking wheel having peripheral projections thereon pivotally linked to the axle between the disks, whereby the disks engage and disengage the upper surface of the ridge to provide furrows for bedding plants without disturbing the profile of the prepared ridge, and the projections mark the earth between the furrows to indicate particular bedding locations for the plants.

2. A furrowing and earth marking apparatus for forming furrows in the top of a prepared earth ridge to prepare a bed for receiving plants, the apparatus comprising, in combination, a frame including a horizontal drawbar having spaced apart ends, the drawbar being disposed transversely of the apparatus at a front portion of the apparatus, a pair of substantially parallel axle mounting members extending rearwardly from the drawbar at the spaced apart ends thereof, axle means spaced rearwardly from the drawbar and disposed transversely of the apparatus, the axle means having spaced apart outer ends and a central portion, the outer ends being mounted in the axle mounting members, a first disk and a second disk each having a curved face and a flat face, the curved face and the flat face of each disk having peripheries which are coextensive, said disks being rotatably mounted on the axle means between the outer ends thereof so that the flat faces of the disks open onto each other, the disks being operable to open a pair of parallel and uniform furrows in the top of the earth ridges, first means extending rearwardly from the drawbar to between the disk means connected between the central portion of the axle and said first means and selectively operable to bow the axle means central portion rearwardly of the outer ends of the axle means to toe-in the disks so that the disks converge forwardly of the axle means, and an earth marking wheel having peripheral projections thereon, a pair of spaced apart parallel arms each having a front end and a rear end, the arms being pivotally mounted to the frame between the disks and extending rearwardly of the axle means, a marking wheel being rotatably mounted between the rear ends of the arms rearwardly of the axle means and operable to mark the earth between the furrows formed by the disks to indicate particular bedding locations for the plants, and a stop connected to the front end of each arm and engageable with the first means when the apparatus is lifted from the earth ridge to prevent the marking wheel from swinging downwardly of the disks, the disks engaging and disengaging the upper surface of the earth ridge to provide furrows for bedding plants without disturbing the profile of the prepared ridge.

3. A furrowing and earth marking apparatus for forming furrows in the top of a prepared earth ridge to prepare a bed for receiving plants, the apparatus comprising, in combination, a frame including a horizontal drawbar having spaced apart ends, the drawbar being disposed transversely of the apparatus at a front portion of the apparatus, a pair of substantially parallel axle mounting members extending rearwardly from the drawbar at the spaced apart ends thereof, axle means spaced rearwardly from the drawbar and disposed transversely of the apparatus, the axle means having spaced apart outer ends and a central portion, the outer ends being mounted in the axle mounting members at fixed locations in the axle mounting members, a first disk and a second disk each having a curved face and a flat face, the curved face and the flat face of each disk having peripheries which are coextensive, said disks being rotatably mounted on the axle means between the outer ends thereof so that the flat faces of the disks open onto each other, first means extending rigidly rearwardly from the drawbar to between the disks, and second means connected between the central portion of the axle and the first means and selectively operable to bow the axle means central portion rearwardly of the outer ends of the axle means to toe-in the disks so that the disks converge forwardly of the axle means, the second means including means journalling the central portion of the axle means, a bolt secured to the axle means central portion journalling means and extending to a threaded end forwardly of the axle means and disposed adjacent the first means, a lug extending from the first means and having an aperture therethrough in which the threaded end of the bolt is disposed, and a nut threaded on the end of the bolt and abutted with the lug, the disks engaging and disengaging the upper surface of the earth ridge to provide furrows for bedding plants without disturbing the profile of the prepared ridge.

4. A furrowing and earth marking apparatus for forming furrows in the top of a prepared earth ridge to prepare a bed for receiving plants, the apparatus comprising, in combination, a frame including a horizontal drawbar having spaced apart ends, the drawbar being disposed transversely of the apparatus at a front portion of the apparatus, a pair of substantially parallel axle mounting members extending rearwardly from the drawbar at the spaced apart ends thereof, axle means spaced rearwardly from the drawbar and disposed transversely of the apparatus, the axle means having spaced apart outer ends and a central portion, the outer ends being mounted in the axle mounting members at fixed locations in the axle mounting members, the central portion of the axle means being displaced rearwardly of the axle means outer ends, a first disk and a second disk each having a curved face and a planar face, the curved face and the planar face of each disk having peripheries which are coextensive, said disks being rotatably mounted on the axle means between the outer ends thereof so that the flat faces of the disks open onto each other, means disposed between the disks for journalling the central portion of the axle means, a rigid member rigidly connected to the drawbar and extending to adjacent the axle means central portion journalling means, means connecting the rigid member to the axle means central portion journalling means and selectively operable to both the axle means central portion rearwardly relative to the outer ends of the axle means for toeing-in the disks so that the disks converge forwardly of the axle means, and an earth marking wheel having peripheral projections thereon, a pair of spaced apart parallel arms each having a front end and a rear end, the arms being pivotally mounted to the frame between the disks and extending rearwardly of the axle means, the marking wheel being rotatably mounted between the rear ends of the arms rearwardly of the axle means, and a stop connected to the front end of each arm and engageable with the rigid member when the apparatus is lifted from the earth ridge to prevent the marking wheel from swinging downwardly of the disks, the disks engaging and disengaging the upper surface of the earth ridge to provide furrows for bedding plants without disturbing the profile of the prepared ridge and the projections marking the earth between the furrows to indicate particular bedding locations for the plants.

References Cited in the file of this patent

UNITED STATES PATENTS

| | | |
|---|---|---|
| 142,753 | Whittemore | Sept. 9, 1873 |
| 536,094 | Newton | Mar. 19, 1895 |
| 725,762 | Nilson | Apr. 21, 1903 |
| 1,103,938 | Campbell | July 21, 1914 |
| 1,166,962 | Altgelt | Jan. 4, 1916 |
| 1,186,365 | Allmon | June 6, 1916 |
| 1,412,135 | Ray | Apr. 11, 1922 |
| 1,639,307 | Neu | Aug. 16, 1927 |
| 1,653,760 | Carey | Dec. 27, 1927 |
| 1,821,829 | Coe et al. | Sept. 1, 1931 |

FOREIGN PATENTS

| | | |
|---|---|---|
| 40,727 | Denmark | Aug. 24, 1929 |